UNITED STATES PATENT OFFICE.

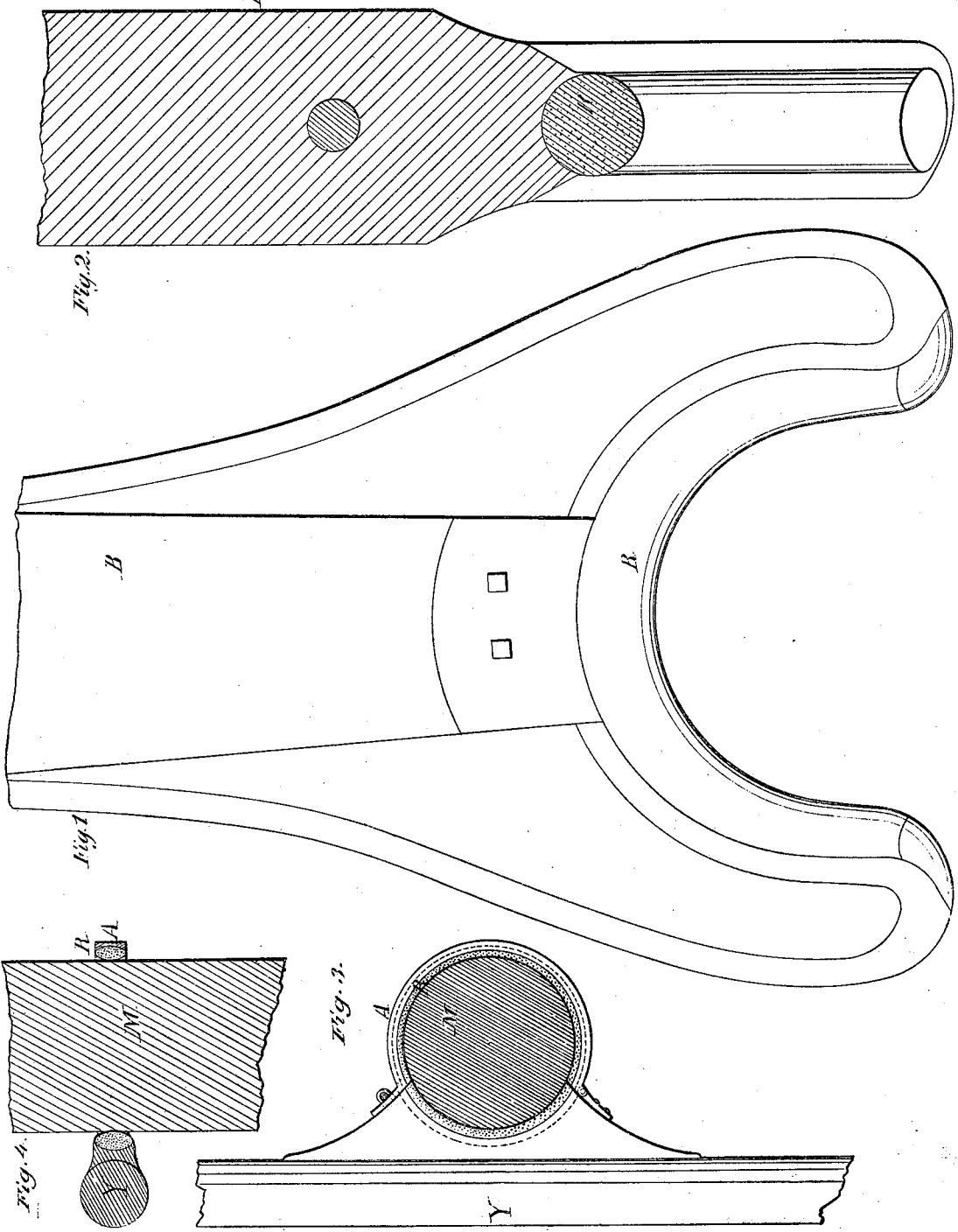

O. P. ROWLAND, OF JAMESPORT, NEW YORK.

ELASTIC LINING FOR BOOM-JAWS.

Specification of Letters Patent No. 28,608, dated June 5, 1860.

*To all whom it may concern:*

Be it known that I, O. P. ROWLAND, of Jamesport, in the county of Suffolk and State of New York, have invented a new and useful Improvement in Lining for Jaws for Booms, Gaffs, Yards, &c.; and I do hereby declare that the following is a full, clear, and exact description of the same, reference being had to the annexed drawing, forming part of this specification, in the several figures of which similar characters of reference denote the same parts.

Figure 1 is a top view of the jaw of the boom with the rubber lining. Fig. 2 is a longitudinal section of the same. Fig. 3 is a cross section showing the attachment of the yard to the mast in square rigged vessels. Fig. 4 is a vertical section of the same.

This invention has reference to the lining of the jaws of booms, gaffs, yards, &c., with india rubber for the purpose of preventing chafing or wear of the parts, the details being as follows:

On the drawing B, is the boom having the jaw into which the mast fits, lined with the india rubber R, the rubber being cast in the required shape and size, and then inserted into the groove, so that chafing of the mast will be prevented, and in fore and aft vessels, where the masts incline, the rubber lining must be thicker at the top, where the mast has its bearing on the jaw, so as to prevent wearing of the parts.

In casting the roll of rubber to constitute this lining it is made of greatest diameter at its middle, tapering toward each end, and the groove for its reception is formed so as to cut away the upper edge of the jaw, so that the rubber roll will occupy the position shown in the drawing, whereby the rake of the mast will be accommodated. The middle swell of the roll gives the greatest elasticity where the greatest pressure is exerted; that is in the line of the boom.

In attaching the yard to the mast in square rigged vessels, the jaw or yoke of the yard is also lined with the same material as shown in Figs. 3 and 4, Y, being the yard having its rubber lining R, M, the mast, and A, the iron strap passing around the mast, being attached to the yoke of the yard at one side, and fastened by a staple and key at the other, for the purpose of holding it securely in place. This strap A, is also lined with the rubber, thus preventing chafing and wear of the parts.

What I claim and desire to secure by Letters Patent is—

The application of an india rubber roll R as a lining for boom, gaff and yard jaws, costructed, arranged and operating substantially as and for the purpose set forth.

In testimony whereof I have hereunto signed my name before two subscribing witnesses.

O. P. ROWLAND.

Witnesses:
GEO. PATTEN,
JOHN S. HOLLINGSHEAD.